United States Patent
Wu et al.

(10) Patent No.: US 7,959,802 B2
(45) Date of Patent: Jun. 14, 2011

(54) WATER PURIFICATION SYSTEM

(75) Inventors: Tung-Chuan Wu, Hsinchu (TW); Jen-Hui Tsai, Hsinchu (TW); Ta-Hsin Chou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 421 days.

(21) Appl. No.: 12/189,968

(22) Filed: Aug. 12, 2008

(65) Prior Publication Data

US 2009/0236270 A1    Sep. 24, 2009

(30) Foreign Application Priority Data

Mar. 20, 2008  (TW) .............................. 97109943 A

(51) Int. Cl.
*B01D 36/00* (2006.01)
(52) U.S. Cl. ...... 210/199; 210/203; 210/206; 210/257.1; 210/258; 210/259; 210/335; 210/748.02; 422/127
(58) Field of Classification Search .................. 210/85, 210/96.1, 167.01, 167.31, 172.1, 194, 189.1, 210/199, 202, 203, 206, 257.1, 258, 259, 210/335, 348, 459, 748.01, 748.02; 138/37, 138/40, 44; 204/157.15; 422/20, 127
See application file for complete search history.

(56) References Cited

U.S. PATENT DOCUMENTS

| | | | | |
|---|---|---|---|---|
| 3,165,266 A | * | 1/1965 | Blum et al. | 241/1 |
| 4,476,225 A | * | 10/1984 | Grigorian et al. | 435/306.1 |
| 4,990,260 A | * | 2/1991 | Pisani | 210/664 |
| 5,494,585 A | * | 2/1996 | Cox | 210/748.11 |
| 5,937,906 A | * | 8/1999 | Kozyuk | 138/37 |
| 6,221,260 B1 | * | 4/2001 | Chahine et al. | 210/748.11 |
| 7,247,244 B2 | * | 7/2007 | Kozyuk | 210/748.13 |
| 7,291,267 B2 | * | 11/2007 | Johnson et al. | 210/321.69 |
| 2002/0096456 A1 | * | 7/2002 | Kim et al. | 210/90 |
| 2009/0162271 A1 | * | 6/2009 | Holloway et al. | 423/580.1 |

FOREIGN PATENT DOCUMENTS

| | | |
|---|---|---|
| CN | 2727152 Y | 9/2005 |
| CN | 1702048 A | 11/2005 |
| CN | 101549927 A | 10/2009 |

* cited by examiner

*Primary Examiner* — Joseph W Drodge
(74) *Attorney, Agent, or Firm* — Rabin & Berdo, P.C.

(57) ABSTRACT

A water purification system performs a water purification process through physical sterilization, and at least includes a compression device and a decompression device. Water is converted into a high-pressure liquid through the compression device, and then is converted into a high-speed fluid by controlling the cross-sectional area of a spout of the decompression device, thus generating physical effects such as pressure drop and shear stress, so as to damage cell walls of bacteria in the liquid to die-off the bacteria. Therefore, purified water is obtained.

30 Claims, 5 Drawing Sheets

WATER PURIFICATION SYSTEM

CROSS-REFERENCE TO RELATED APPLICATIONS

This non-provisional application claims priority under 35 U.S.C. §119(a) on Patent Application No(s). 097109943 filed in Taiwan, R.O.C. on Mar. 20, 2008 the entire contents of which are hereby incorporated by reference.

BACKGROUND OF THE INVENTION

1. Field of the Invention

The present invention relates to a water treatment system, more particularly, to a water purification system.

2. Related Art

As modern people pay more attention to the quality of life, leisure activities are increasingly diversified, and currently, swimming pools and hot springs are common places for leisure activities. However, as people directly contact water, pollutants such as sweat, fat, cosmetics, and urine brought by swimmers during using, and dusts and leaves from outside make the water contaminated and turbid, and thus people have higher requirements on the safety and quality of the water. Therefore, organizations of swimming pools and hot springs must purify the water with different methods to ensure that the water quality meets the requirements of regulations. The common disinfection methods include chlorination disinfection, ozone disinfection, and UV disinfection.

Currently, chlorination disinfection is the most commonly used disinfection method, and chlorine was the dominant means for chlorination disinfection in the past, but now, sodium hypochlorite (commonly known as bleach) and chlorinated cyanuric acid (commonly known as solid chlorine, powder chlorine) are used instead due to the high risk of chlorine. The Business Sanitation Criteria issued by the Center for Disease Control, Department of Health, Executive Yuan expressly provides that free residual chlorine in the water of a swimming pool should be kept at 1-3 ppm, and the total bacterial count of *Escherichia coli* should be kept at a standard of lower than 1 CFU per 100 ml water. However, in addition to the function of sterilization, free residual chlorine can also oxidize organics and inorganics in the water due to high oxidation capability (−1.49V). Such oxidation process has two effects: one is the consumption of the free residual chlorine, and the other is the generation of combined chloramine products through the oxidation. Part of the combined chloramines is carcinogens, such as trihalomethanes (THMs), some of the combined chloramines may cause skin irritation, eye irritation, and respiratory discomfort, and so on. When the concentration of the combined chloramines is too high, the quality of the swimming pool water will be changed significantly, the concentration of free residual chlorine cannot be increased by using common amount of chlorine, and the quality of the water will be deteriorated and get turbid rapidly.

In order to address the problem of sterilization in water treatment, China Patent Publication No. CN2727152Y discloses a circulating treatment device for bathing water and swimming pool water, in which the water treatment includes filter processes of centrifugal sewage discharge, reverse osmosis, and active carbon filter, and finally UV sterilization is performed to finish the water treatment. China Patent Publication No. CN1702048A discloses a circulating physical-biological-chemical treatment system for (indoor) swimming pool water, which utilizes three treatment methods including physical (filter), chemical (sterilization), and biological (sewage treatment) to realize the purpose of water treatment.

However, the water treatment methods in prior art have disadvantages, for example, No. CN2727152Y patent is limited in the UV bactericidal efficiency and treatment capacity and cannot perform sterilization of water of large volume, and No. CN1702048A patent has the trouble that the residues will do harm to human body as chlorine dioxide is used in the sterilization.

In the field of household water purifier, there are many types of household water purifiers in the market, such as RO reverse osmosis, electrolysis, active carbon. According to the so-called reverse osmosis, a pressure greater than osmotic pressure is applied on the source water to generate a reverse osmosis effect, such that inorganic salts, heavy metals, organics, fungus, particles in the water cannot pass through the semipermeable membrane, and merely water molecules and smaller molecular salts can penetrate through the membrane and flow towards a side of pure water, while the pollutants will be condensed in the source water. According to the so-called electrolysis, a membrane or salt bridge is used during electrolysis of water to block the exchange of ions, such that the pH values of the water is changed, and at the same time, the oxidation reduction potential and the dissociation constant are changed, thus generating acidic water or basic water. Further, active carbon is a porous carbonaceous material having a porous structure, so it has a large surface area and has a very strong adsorption capacity. However, due to the fixed adsorption capacity, when the pores of the active carbon are saturated, the adsorption effect is reduced significantly. Therefore, the active carbon must be changed after being used for a period of time, otherwise, the pores of the active carbon will intercept the substances in the water, and bacteria will grow thereon, such that the active carbon becomes a breeding ground for the propagation of bacteria.

However, reverse osmosis will filter off mineral substances in the water completely, and long-term drinking of such water will cause some ions in the cells get out of the cells to balance the osmotic pressure due to the osmotic pressure inside and outside, and problems such as loss of calcium ions will occur, resulting in muscle weakness, and serious osteoporosis. Further, excessive wastewater is discharged during the reverse osmosis, thus causing waste of water resource. Additionally, the reverse osmosis cannot filter off bacteria and virus in the water effectively, thus the water after treatment cannot be drunk directly.

For the electrolysis water purification method, the water resource should be clean and free of contamination, otherwise, the electrolyzed water will be condensed water containing heavy metals. Due to the ion and anion, many heavy metals are condensed into a basic side, thus the condensed water containing heavy metals will be drunk.

Accordingly, the various household water purifiers mentioned above is inconvenient for users, because the purified water may not be suitable for drinking, and the filter material should be changed periodically.

SUMMARY OF THE INVENTION

The sterilization function of chloride cannot be denied, but pollutants in swimming pools will be oxidized by free residual chloride, and thus the negative effects brought by the oxidation of chloride are always unsolvable problems in water treatment. Moreover, for drinking water, clean and secure water are required. In order to solve the above problems, the present invention is directed to a physical sterilization water purification system.

The present invention provides a water purification system, which includes a water tank, a filter device, a compression device, and a decompression device. Water to be purified from a water tank is filtered through the filter device for removing large pollutants, and then is pressurized by the compression device to 5000-40000 psi and converted into a high-pressure liquid. The decompression device forms spout by means of micro holes, grooves, size difference, or position difference, and the design of reducing the cross-sectional area of the spout allows the high-pressure liquid to be ejected rapidly, so as to convert high-pressure water into a high-speed fluid, thus damaging cell walls of bacteria in the fluid through the effects of pressure drop, shear stress, and cavitation, thereby realizing the purpose of water purification.

The present invention has an efficacy of damaging the cell walls of bacteria in water to cause death of the bacteria by physical effects of pressure drop, shear stress, and cavitation generated by the compression device and the decompression device without adding any chemicals, so as to purify water, thus preventing the harmful chemicals and residuals thereof after reaction from remaining in the fluid. Therefore, the present invention is applicable to large scale water purification of swimming pools, and is also applicable to small scale water purification of household water.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the objectives, constructions, features, and functions of the present invention to be further understood, the present invention is further described with reference to the following embodiments.

The water purification system of the present invention is applicable to, but not limited to, large scale circulating water treatment systems such as swimming pools, bathing pools, and hot springs, and drinking water treatment systems such as household water purifiers.

Figure 1:
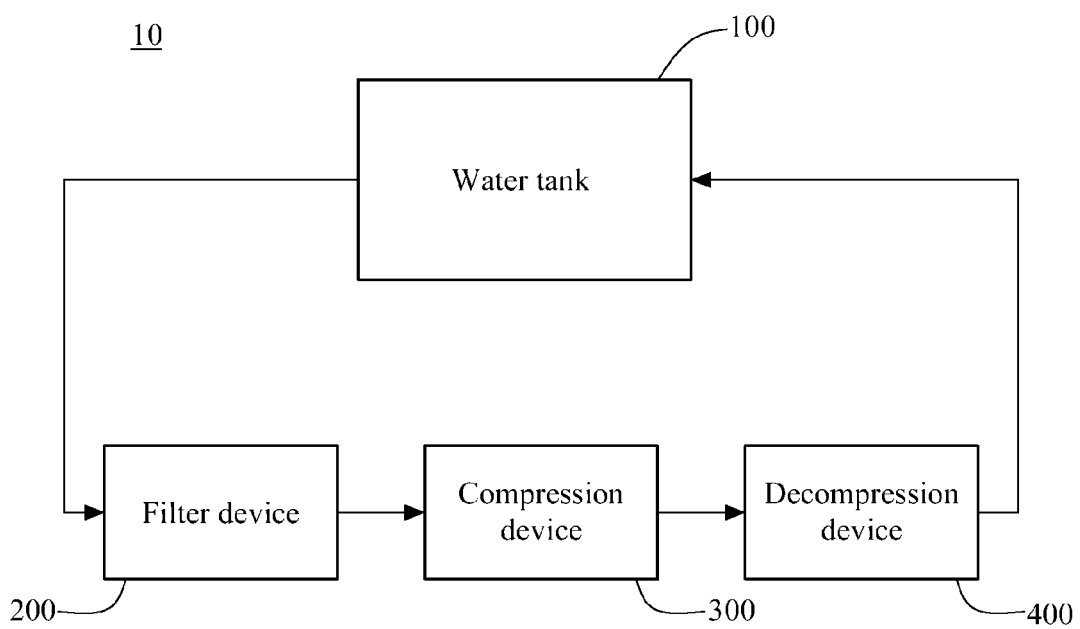
FIG. 1 shows a water purification system according to a first embodiment of the present invention.

The water purification system according to a first embodiment of the present invention, as shown in FIG. 1, is applicable to large scale water purification systems such as swimming pools. A water purification system 10 includes a water tank 100, a filter device 200, a compression device 300, and a decompression device 400.

The water tank 100 is a storage tank capable of accommodating water, and according to the first embodiment of the present invention, it is a swimming pool, namely, an open water tank 100. The water tank 100 at least has an outlet and an inlet (not shown), and is connected to the filter device 200, the compression device 300, and the decompression device 400 through pipelines (i.e., solid lines in FIG. 1), so as to form a circulating water path.

The filter device 200 is connected to the outlet of the water tank 100 through a pipeline. The filter device 200 can be a single layer of filter screen or a plurality of layers of filter screen for blocking pollutants from the water tank 100 by isolating and permeating, thus performing a first water purification. The compression device 300 is connected to the filter device 200 and is a high pressure plunger pump for pressurizing water to 5000-40000 psi to form a high-pressure liquid.

Figure 2A:
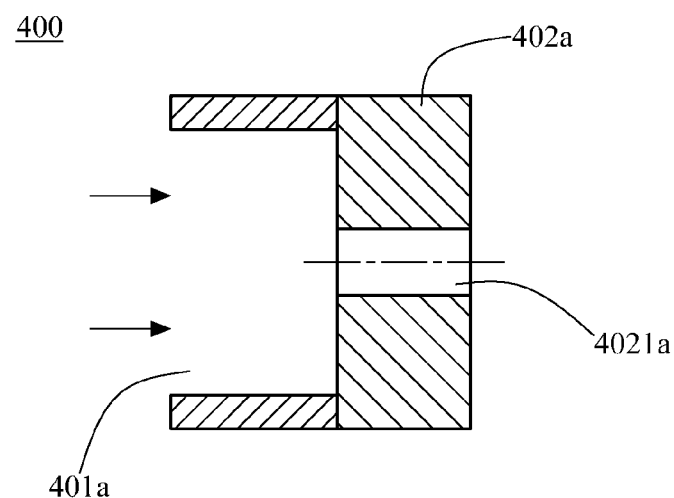
FIG. 2A is a structural view of a decompression device of a water purification system of the present invention.

The decompression device 400 is connected to the compression device 300 through a pipeline. Referring to FIG. 2A together, the decompression device 400 includes a joint 401a and a barrier 402a. One end of the joint 401a is connected to the pipeline, and the other end is closed by the barrier 402a. The barrier 402a has more than one spout 4021a disposed thereon. The spout 4021a has an inner diameter much smaller than that of the joint 401a, and the decompression device 400 ejects the high-pressure liquid from the compression device 300 at high speed from the spout 4021a, so as to form a high-speed fluid through the cross-sectional area difference. When the high-pressure liquid is ejected at high speed, the pressure of the water drops sharply, and the physical effects of sharp pressure drop, shear stress, and cavitation generated by the high-speed fluid are thus generated. Therefore, cell walls of bacteria in the water are broken due to the pressure drop, shear stress, and cavitation effect, causing death of the bacteria. The spout 4021a may be in the form of holes, such as micro holes and grooves, so as to control the intensity of pressure drop and shear stress by controlling and designing the size difference of the spout 4021a and the joint 401a, so as to kill bacteria according to characteristics of different bacteria.

Furthermore, in order to avoid variation of the size difference of the spout 4021a and the joint 401a due to the high-pressure liquid, the joint 401a and the barrier 402a can be made of or coated by high-hardness materials, such metal, ceramic, and diamond.

Figure 2B:
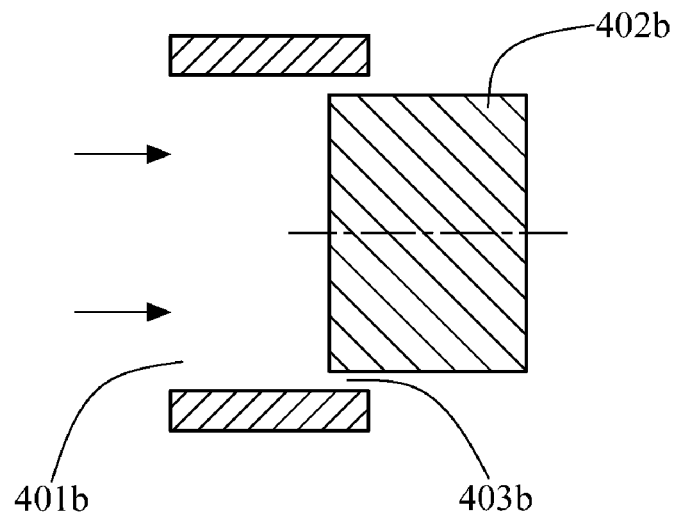
FIG. 2B is a structural view of a decompression device of a water purification system of the present invention.
Figure 2C:
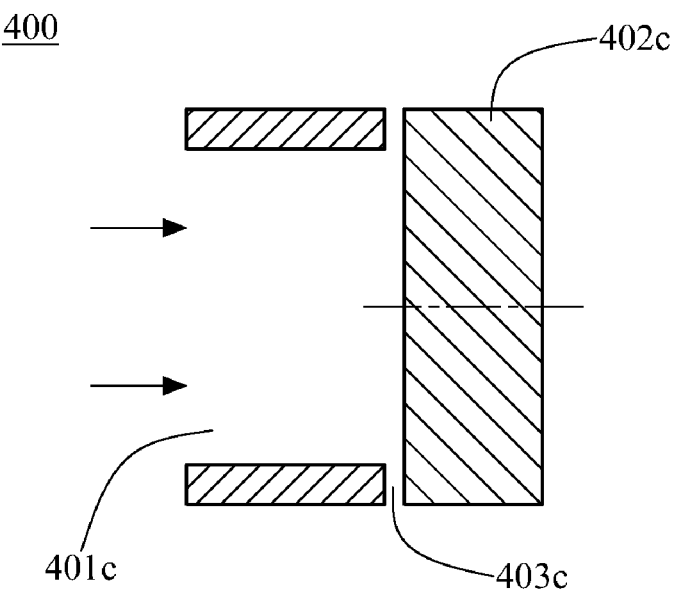
FIG. 2C is a structural view of a decompression device of a water purification system of the present invention.

The water purification system of the present invention achieves the physical effect of sharp pressure drop by the design of size difference of the cross-sectional area of the decompression device 400, so in addition to the design shown in FIG. 2A, the decompression device 400 can also have the cross-sectional area as designed in FIGS. 2B and 2C. As shown in FIG. 2B, the barrier 402b has an outer diameter smaller than an inner diameter of the joint 401b and extends into the joint 401b, such that the barrier 402b and the joint 401b are separated by a pitch to form the spout 403b. Similarly, the inner diameter of the spout 403b is smaller than that of the joint 401b, so the high-pressure liquid from the compression device 300 is ejected from the spout 403b at high speed to form the high-speed fluid, thus generating the physical effects of sharp pressure drop and shear stress.

As shown in FIG. 2C, the outer diameter of the barrier 402c is greater than the inner diameter of the joint 401c, and the barrier 402c is disposed outside the joint 401c and is separated from the joint 401c by a pitch, such that the spout 403c is formed between the barrier 402c and the joint 401c. Similarly, the aperture of the spout 403c is smaller than the inner diameter of the joint 401c, so the high-pressure liquid from the compression device 300 is ejected from the spout 403c at high speed to form the high-speed fluid, thus generating the physical effect of sharp pressure drop. Meanwhile, the spout 403c switches the ejection direction of the high-speed fluid, such that the high-speed fluid generates the physical effect of shear stress and cavitation, and the cell walls of the bacteria can also be damaged to cause death by the pressure drop and shear stress effects.

Figure 3A:
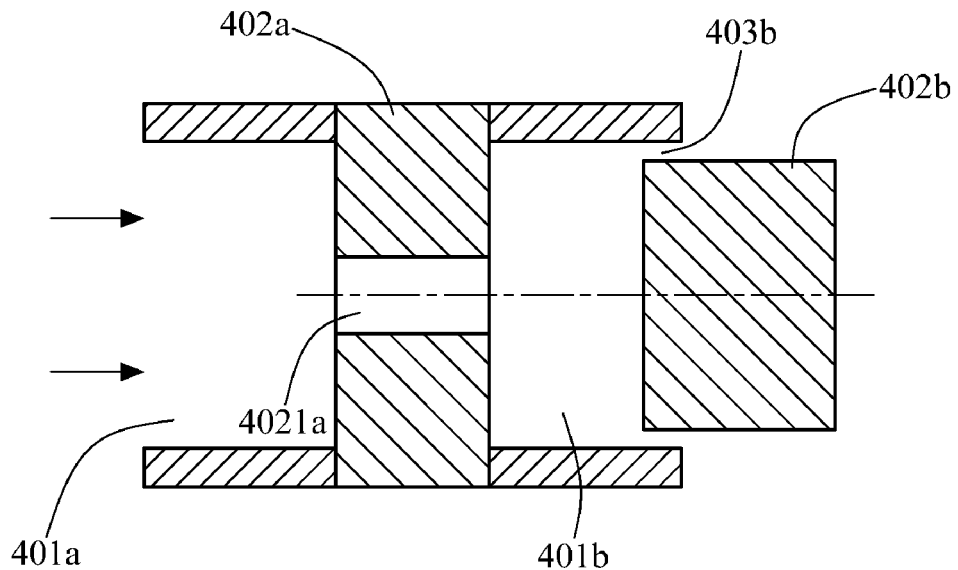
FIG. 3A is a first combination structural view of a decompression device of a water purification system of the present invention.
Figure 3B:
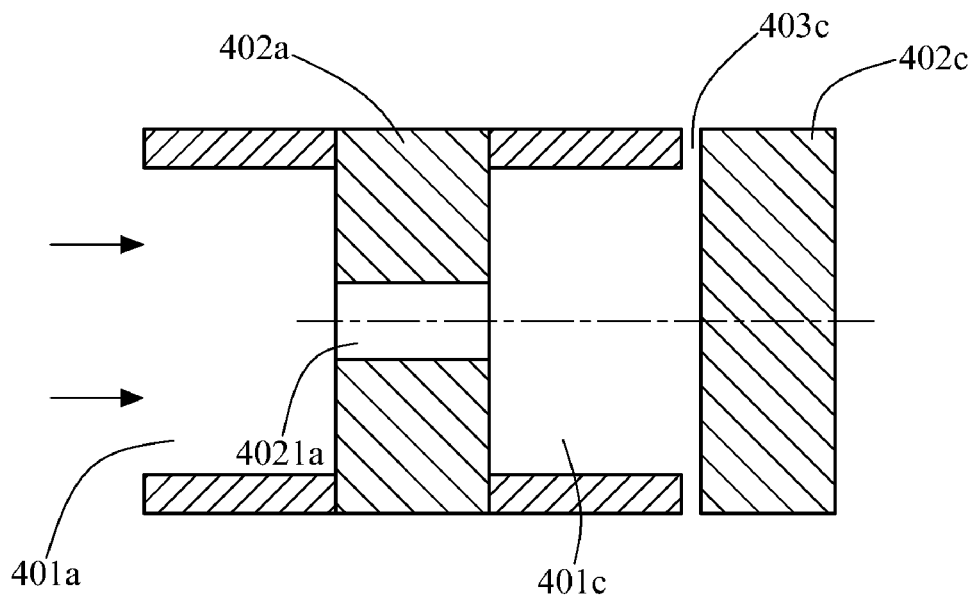
FIG. 3B is a second combination structural view of a decompression device of a water purification system of the present invention.

According to the water purification system of the present invention, various cross-sectional area designs of the decompression device shown in FIGS. 2A, 2B, and 2C can also be combined and arranged. Next, referring to FIG. 3A, a configuration of combining FIG. 2A and FIG. 2B (in which the reference numerals of FIGS. 2A and 2B are used) is shown. The decompression device includes two spouts 4021a, 403b, two barriers 402a, 402b, and two joints 401a, 401b. A barrier 402b extends into one joint 401b and is separated from the joint 401b by a pitch to form the spout 403b. A first pressure drop is performed on the high-pressure liquid by the spout 4021a on the other barrier 402a. The high-speed fluid impacts on a surface of the barrier 402b, and then is ejected through the spout 403b to perform a second pressure drop. In addition to the shear stress, the physical effect for forming the impact force when the high-speed fluid impacts the barrier 402b can also be used to damage the cell walls to kill the bacteria. Referring to FIG. 3B, a configuration of combining FIG. 2A and FIG. 2C (in which the reference numerals of FIGS. 2A and 2C are used) is shown. The decompression device includes two spouts 4021a, 403c, two barriers 402a, 402c, and two joints 401a, 401c. A barrier 402c is disposed outside the joint 401c and is separated from the joint 401c by a pitch to form the spout 403c. A first pressure drop is performed on the high-pressure liquid by the spout 4021a on the other barrier 402a. The high-speed fluid impacts on a surface of the barrier 402c, and then is ejected through the spout 403c to perform a second pressure drop, such that the high-speed fluid generates the physical effects of pressure drop, shear stress, and cavitation to kill the bacteria.

Figure 4:
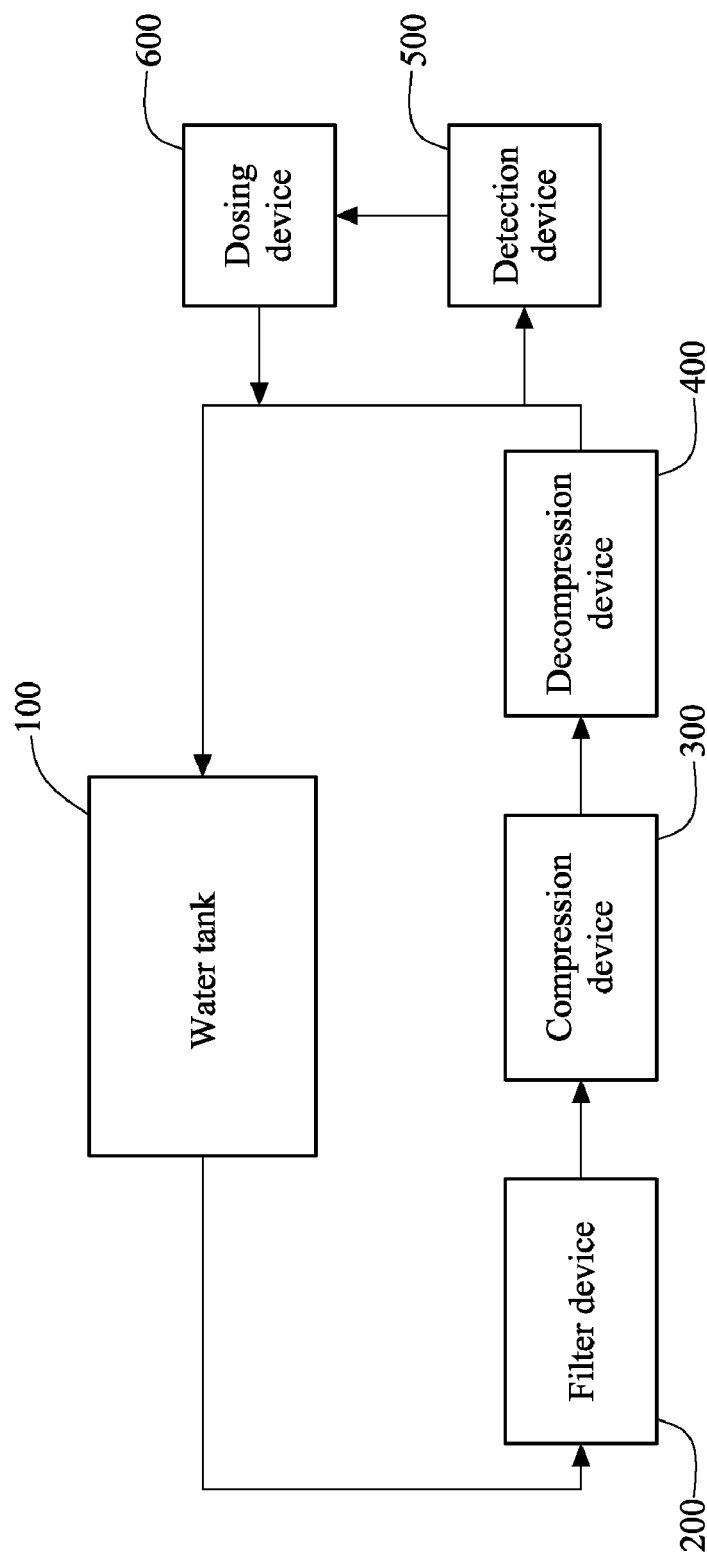
FIG. 4 shows an additional detection device and dosing device of a water purification system of the present invention.

According to the water purification system of the present invention, the high-speed fluid passing through the decompression device 400 is connected to the inlet of the water tank 100 through a pipeline, thus forming a circulating water purification system, so as to realize the purpose of water purification through physical sterilization. As the types of bacteria are various, and the strain features are different, the residual bacteria after the water purification treatment of the present invention can be killed by special chemical sterilization according to the strains of the residual bacteria. Referring to FIG. 4, the decompression device 400 can have a detection device 500 and a dosing device 600 connected to a back end thereof. The detection device 500 detects the bacteria amount in the water flow or samples the water, and then according to the detection or sampling results, orders the dosing device 600 to perform chemical sterilization with small amount or specific chemical bactericide, so as to enhance the sterilization effect.

Further, according to the water purification system of the present invention, the temperature of the high-speed fluid will be raised due to the friction between the water flow and the solid contact surface and other factors, thus the temperature of the water can be controlled by controlling the flow rate. Therefore, the water purification system of the present invention also has the efficacy of increasing the temperature of the water, thus being applicable to warm-water swimming pool to reduce the energy for heating the water.

Figure 5:
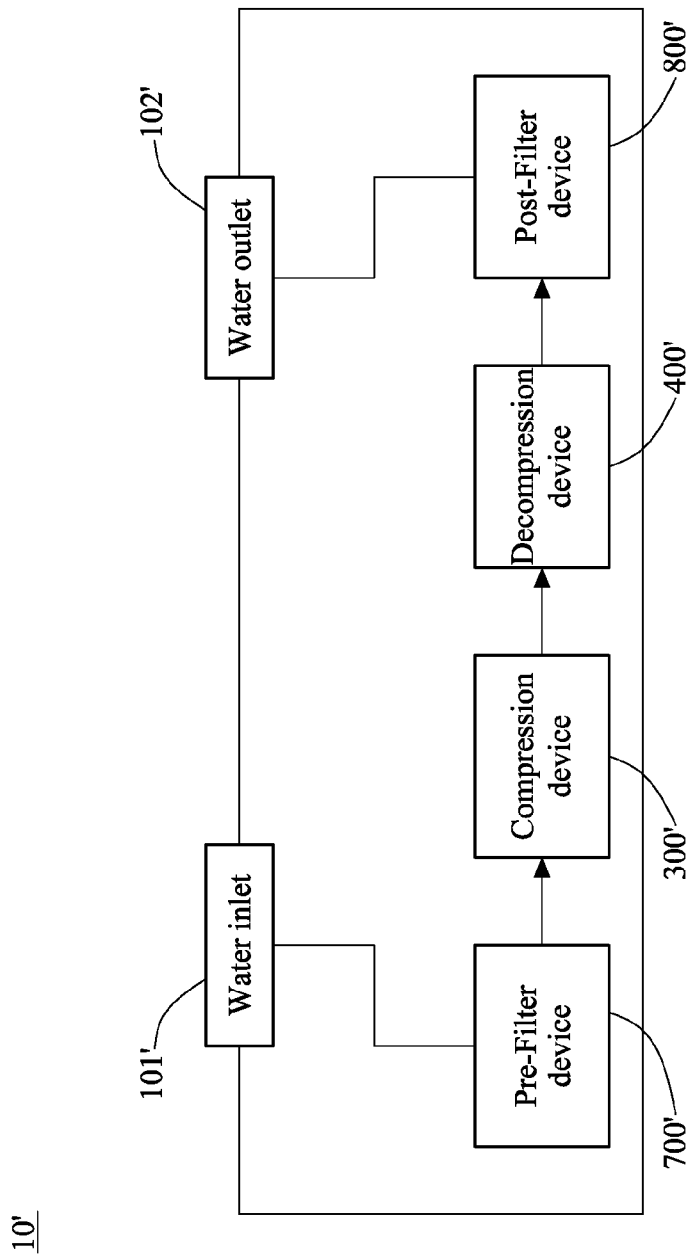
FIG. 5 shows a water purification system according to a second embodiment of the present invention.

The water purification system according to a second embodiment of the present invention, as shown in FIG. 5, is applicable to a drinking water treatment system, such as household water purifier. A water purification system 10' includes a water inlet 101', a pre-filter device 700', a compression device 300', a decompression device 400', a post-filter device 800', and a water outlet 102'. The water purification process of the second embodiment of the present invention is the same as that of the first embodiment and will not be repeated herein, but is applied in household drinking water treatment system. The water inlet 101' is a water pipeline (such as a water faucet) connected to a house. The pre-filter device 700' can be filter cotton for removing impurities in the water. The post-filter device 800' can be active carbon. As the compression device 300' and the decompression device 400' at the middle section kill bacteria through physical sterilization, the working life of the post-filter device 800' can be prolonged, and the time period for changing the filter material is prolonged

What is claimed is:

1. A water purification system, comprising:
a compression device, connected to a water tank, for compressing water from the water tank into a high-pressure liquid;
a decompression device, connected to the compression device, having at least one spout, at least one joint, and at least one barrier, wherein an outer diameter of the barrier is smaller than the inner diameter of the joint, the barrier extends into the joint and is separated from the joint by a pitch, the pitch forms the spout, and the inner diameter of the spout is smaller than the joint, the high-pressure liquid is ejected from the spout at a high speed to form a high-speed fluid, thus generating a pressure drop, stress, and cavitation effect, and
a filter device, connected to the water tank and the compression device, for blocking large pollutants from water in the water tank.

2. The water purification system according to claim 1, wherein the compression device is a high pressure plunger pump.

3. The water purification system according to claim 1, wherein the decompression device comprises two spouts, two joints, and two barriers, one of the spouts is disposed on one of the barriers, and an outer diameter of the other barrier is smaller than an inner diameter of the two joints, the other barrier extends into one of the joints and is separated from the joint by a pitch to form the other spout, and an inner diameter of the two spouts is smaller than that of the two joints.

4. The water purification system according to claim 1, wherein the decompression device comprises two spouts, two joints, and two barriers, one of the spouts is formed by the barrier, is disposed outside one of the joints and is separated from the joint by a pitch, and the other barrier extends into one of the joints and is separated from the joint by another pitch to form another spout, and the inner diameter of the two spouts is smaller than that of the two joints.

5. The water purification system according to claim 1, wherein the spout ejects the high-pressure liquid at a high speed to form the high-speed fluid.

6. The water purification system according to claim 1, further comprising a dosing device for disinfecting, connected to a back end of the decompression device.

7. The water purification system according to claim 1, further comprising a detection device and a dosing device for disinfecting, connected to a back end of the decompression device.

8. The water purification system according to claim 1, wherein the compression device pressurizes the water to 5000-40000 psi to form the high-pressure liquid.

9. A water purification system, comprising:
a water inlet, for connecting a water pipeline;
a pre-filter device, connected to the inlet;
a compression device, connected to the pre-filter device, for pressurizing water into a high-pressure liquid;
a decompression device, connected to the compression device, having at least one spout, at least one joint and at least one barrier, wherein an outer diameter of the barrier is smaller than the inner diameter of the joint, the barrier extends into the joint and is separated from the joint by a pitch, the pitch forms the spout, and the inner diameter of the spout is smaller than that of the joint, the high-pressure liquid is ejected from the spout at a high speed to form a high-speed fluid, thus generating a pressure drop, stress, and cavitation effect;
a post-filter device, connected to the decompression device; and
a water outlet, connected to the post-filter device.

10. The water purification system according to claim 9, wherein the compression device is a high pressure plunger pump.

11. The water purification system according to claim 9, wherein the decompression device comprises two spouts, two joints, and two barriers, one of the spouts is disposed on one of the barriers, and an outer diameter of the other barrier is smaller than an inner diameter of the two joints, the other barrier extends into one of the joints and is separated from the joint by a pitch to form the other spout, and an inner diameter of the two spouts is smaller than that of the two joints.

12. The water purification system according to claim 9, wherein the decompression device comprises two spouts, two joints, and two barriers, one of the spouts is formed by the barrier, is disposed outside one of the joints and is separated from the joint by a pitch, and the other barrier extends into one of the joints and is separated from the joint by another pitch to form another spout, and the inner diameter of the two spouts is smaller than that of the two joints.

13. The water purification system according to claim 9, wherein the spout ejects the high-pressure liquid at a high speed to form the high-speed fluid.

14. The water purification system according to claim 9, further comprising a dosing device for disinfecting, connected to a back end of the decompression device.

15. The water purification system according to claim 9, further comprising a detection device and a dosing device for disinfecting, connected to a back end of the decompression device.

16. The water purification system according to claim 9, wherein the compression device pressurizes the water to 5000-40000 psi to form the high-pressure liquid.

17. A water purification system, comprising:
a compression device, connected to a water tank, for compressing water from the water tank into a high-pressure liquid;
a decompression device, connected to the compression device, having at least one spout, at least one joint, and at least one barrier, wherein an outer diameter of the barrier is greater than an inner diameter of the joint, the barrier is disposed outside the joint and is separated from the joint by a pitch, the pitch forms the spout, and the inner diameter of the spout is smaller than the joint, the high-pressure liquid is ejected from the spout at a high speed to form a high-speed fluid, thus generating a pressure drop, stress, and cavitation effect, and
a filter device, connected to the water tank and the compression device, for blocking large pollutants from water in the water tank.

18. The water purification system according to claim 17, wherein the compression device is a high pressure plunger pump.

19. The water purification system according to claim 17, wherein the decompression device comprises two spouts, two joints, and two barriers, one of the spouts is disposed on one of the barriers, the outer diameter of the other barrier is greater than the inner diameter of the two joints, the other barrier is disposed outside one of the joints and is separated from the joint by a pitch to form the other spout, and the inner diameter of the two spouts is smaller than that of the two joints.

20. The water purification system according to claim 17, wherein the spout ejects the high-pressure liquid at a high speed to form the high-speed fluid.

21. The water purification system according to claim 17, further comprising a dosing device for disinfecting, connected to a back end of the decompression device.

22. The water purification system according to claim 17, further comprising a detection device and a dosing device for disinfecting, connected to a back end of the decompression device.

23. The water purification system according to claim 17, wherein the compression device pressurizes the water to 5000-40000 psi to form the high-pressure liquid.

24. A water purification system, comprising:
a water inlet, for connecting a water pipeline;
a pre-filter device, connected to the inlet;
a compression device, connected to the pre-filter device, for pressurizing water into a high-pressure liquid;
a decompression device, connected to the compression device, having at least one spout, at least one joint and at least one barrier, wherein an outer diameter of the barrier is greater than an inner diameter of the joint, the barrier is disposed outside the joint and separated from the joint by a pitch, the pitch forms the spout, and the inner diameter of the spout is smaller than that of the joint, the high-pressure liquid is ejected from the spout at a high speed to form a high-speed fluid, thus generating a pressure drop, stress, and cavitation effect;
a post-filter device, connected to the decompression device; and
a water outlet, connected to the post-filter device.

25. The water purification system according to claim 24, wherein the compression device is a high pressure plunger pump.

26. The water purification system according to claim 24, wherein the decompression device comprises two spouts, two joints, and two barriers, one of the spouts is disposed on one of the barriers, the outer diameter of the other barrier is greater than the inner diameter of the two joints, the other barrier is disposed outside one of the joints and is separated from the joint by a pitch to form the other spout, and the inner diameter of the two spouts is smaller than that of the two joints.

27. The water purification system according to claim 24, wherein the spout ejects the high-pressure liquid at a high speed to form the high-speed fluid.

28. The water purification system according to claim 24, further comprising a dosing device for disinfecting, connected to a back end of the decompression device.

29. The water purification system according to claim 24, further comprising a detection device and a dosing device for disinfecting, connected to a back end of the decompression device.

30. The water purification system according to claim 24, wherein the compression device pressurizes the water to 5000-40000 psi to form the high-pressure liquid.

* * * * *